United States Patent [19]

Vermilion et al.

[11] 3,711,646

[45] Jan. 16, 1973

[54] SYSTEM AND METHOD FOR PRINTING ALPHA-NUMERICS AND GRAPHICS

[75] Inventors: Everette E. Vermilion, Seattle; Eugene B. Seeley, Redmond; Malcolm D. Lefcort, Seattle, all of Wash.

[73] Assignee: Sector Corporation, Bellevue, Wash.

[22] Filed: Jan. 25, 1971

[21] Appl. No.: 109,098

[52] U.S. Cl. ................178/25, 179/2 DP, 346/74 ES

[51] Int. Cl. ..............................................H04l 15/24

[58] Field of Search ........178/25, 15, 26 R, 26 A, 30, 178/6 BW; 179/2 C, 2 DP, 1 C; 346/74 E, 74 ES

[56] References Cited

UNITED STATES PATENTS

| | | | |
|---|---|---|---|
| 2,930,847 | 3/1960 | Metzger | 178/30 |
| 3,300,017 | 1/1967 | Yazejian et al. | 346/74 E |
| 3,316,555 | 4/1967 | Barish | 178/25 |
| 3,419,886 | 12/1968 | Ortlieb | 178/30 |
| 3,354,817 | 11/1967 | Sakurai et al | 178/30 |
| 3,479,453 | 11/1969 | Townsend | 178/7.5 R |
| 3,609,238 | 9/1971 | Hodel | 346/74 ES |
| 3,643,263 | 2/1972 | Fowler | 346/74 ES |

*Primary Examiner*—Ralph D. Blakeslee
*Attorney*—Graybeal, Cole & Barnard

[57] ABSTRACT

System and method for handling a plurality of electronic signals representing both alpha-numeric characters and graphics data. The coded alpha-numeric bits are directed to a decoder for conversion to a dot matrix and then to a writing head for printing on electrosensitive paper. The coded graphics bits are not relayed to the decoder but instead are transmitted to the writing head for direct print out on the electrosensitive paper. A control circuit monitors the incoming bit stream to shift the terminal between alpha-numeric and graphics printing as the arriving data pulses require.

15 Claims, 3 Drawing Figures

PATENTED JAN 16 1973

3,711,646

EVERETTE E. VERMILION
EUGENE B. SEELEY
MALCOLM D. LEFCORT
INVENTORS

BY Graybeal, Cole & Barnard
ATTORNEYS

EVERETTE E. VERMILION
EUGENE B. SEELEY
MALCOLM D. LEFCORT
INVENTORS

BY
Graybeal, Cole & Barnard
ATTORNEYS

SYSTEM AND METHOD FOR PRINTING ALPHA-NUMERICS AND GRAPHICS

BACKGROUND OF THE INVENTION

The invention relates generally to the field of computer terminals and particularly to a system and method for remote terminal transmission and receiving of data which is delivered as hard copy alpha-numerics and/or graphics.

Computer terminals are a major category of the computer peripheral equipment industry. One segment of the computer peripheral industry is remote data terminals which enable the user to transmit and receive data. These terminals have growing application in remote computer time-sharing and remote batch processing of data. Scientific, technical, and educational institutions display an increasing need and desire for the use of remote time-sharing computers. Most frequently this use will be via a telephone network. Desirably these terminals must function at asynchronous speeds, be reasonable quiet, and produce hard copy or printed-out information which can be seen as it is printed. Additionally, they should be portable, and usable on dial-up telephone networks at speeds which can be handled by the dial-up networks. It is known that most time-sharing services are primarily geared to teletypes or perhaps one or two other recognized devices. Known terminals, however, may have disadvantages or deficiencies for the user. Speed may be too slow in terms of the characters per second which can be printed and impact printers, for instance, have a high noise level. A long recognized problem has been the lack of a terminal with hard copy graphics capability. The one known exception is expensive and lacks other needed features, such as speed and resolution. Light weight for portability is also desirable. The printing method utilized by a terminal, whether it be impact, thermal, ink or electric, may restrict speed. In some of the known terminals the character is not visible immediately after printing. Some terminals do not have built-in acoustic couplers. The printing rate for the reasonably foreseeable future in the time-sharing industry is estimated to be around 120 characters per second and the majority of the known terminals are not capable of producing hard copy at that speed. Any one or a combination of the above deficiencies can therefore make a known terminal unacceptable to a potential user.

The means by which typical time-shared or local computer users obtain output from a computer are divided among several types. One type is an alpha-numeric printer including line printers and serial printers such as teletypes. Others are X-Y plotters, cathode ray tube (CRT) displays, paper or magnetic tape, and, for limited information, a voice answer. A CRT can display both alpha-numeric and graphic information but suffers from the lack of a hard or permanent picture or other permanent readable copy of the information contained thereon. Some machines have been announced which provide a permanent copy of CRT displays, but they are expensive and inconvenient for a typical computer user. The voice answer output device is incapable of providing a large amount of information to a user primarily because of the limited rate at which the user can understand the output and the limited time he can remember it. Alpha-numeric printers of proper design can print at up to 120 characters per second on existing dial-up telephone lines but with very limited, that is marginally useful, graphics output. When an alpha-numeric printer is used with an X–Y plotter, the printer-plotter combination can be capable of generating hard copy of both alpha-numeric and graphic information at the rate limit of existing dial-up telephone networks. However, the use of two machines while interrogating a computer can be distracting at best. Additionally, each machine is of different construction and mode of operation.

SUMMARY OF THE INVENTION

Remote terminal system and method for use with a computer for printing data both in alpha-numerics and graphics. The system receives a bit stream representing characters and data from the computer and converts acoustic coupler voltage levels to logic voltage levels and converts the incoming flow of serial signals to parallel pulses. The parallel pulses are then fed to a decoder for conversion into a dot matrix, to a mode switch for selecting the printing mode in alpha-numerics or graphics, and to a circuit performing a number of control operations including carriage returns, line feeds, head motor stepping, commanding the writing head to print in alpha-numerics or in graphics and for commanding the head to write. Thus, incoming data can be sent directly via the mode switch to the writing head so that the terminal can print out directly in graphics or the pulses can be sent via the decoder for converting the pulses to a dot matrix for printing in alpha-numerics.

The system uses electrosensitive writing paper and a writing head consisting of seven or more small diameter or rectangular conductors. The conductors are equally spaced and arranged in a vertical array. The characters are printed by pulsing the conductors as the head travels across the paper. In the alpha-numerics mode the signals are sent to the conductors via the decoder. In the graphics mode the bits are furnished directly to the conductors of the writing head.

Accordingly, it is among the many features, advantages and objects of this invention to provide a system and method for printing alpha-numerics and graphics which is relatively inexpensive and combines the best characteristics of an alpha-numeric printer with a good resolution X–Y plotter. The invention prints asynchronously. It generates graphics information with high resolution and the characters and the data are visible as they are printed, thus giving instant curve plots which disclose trends not readily discernible in tabulated data. Bar charts with variable cross-hatching and shading can also be plotted. It permits the use of known codes, such as ASCII, EBCDIC, etc., and the incoming code pulses or bits are directly printed as dots, without being routed through the decoder, for generating graphic displays. The system prints at a slower speed than alpha-numerics when printing incoming graphics data, but covers blank space between graphic outputs at alpha-numeric speed. The graphics printing speed of the system is the same as the alpha-numeric printing speed in a hard-wired installation but is limited to the rate of a dial-up acoustic coupler used with telephone lines. Its high speed printing rate, light weight and portability, low cost, and graphics capability make it unique as a remote terminal.

DESCRIPTION OF PREFERRED EMBODIMENT

Figure 1:
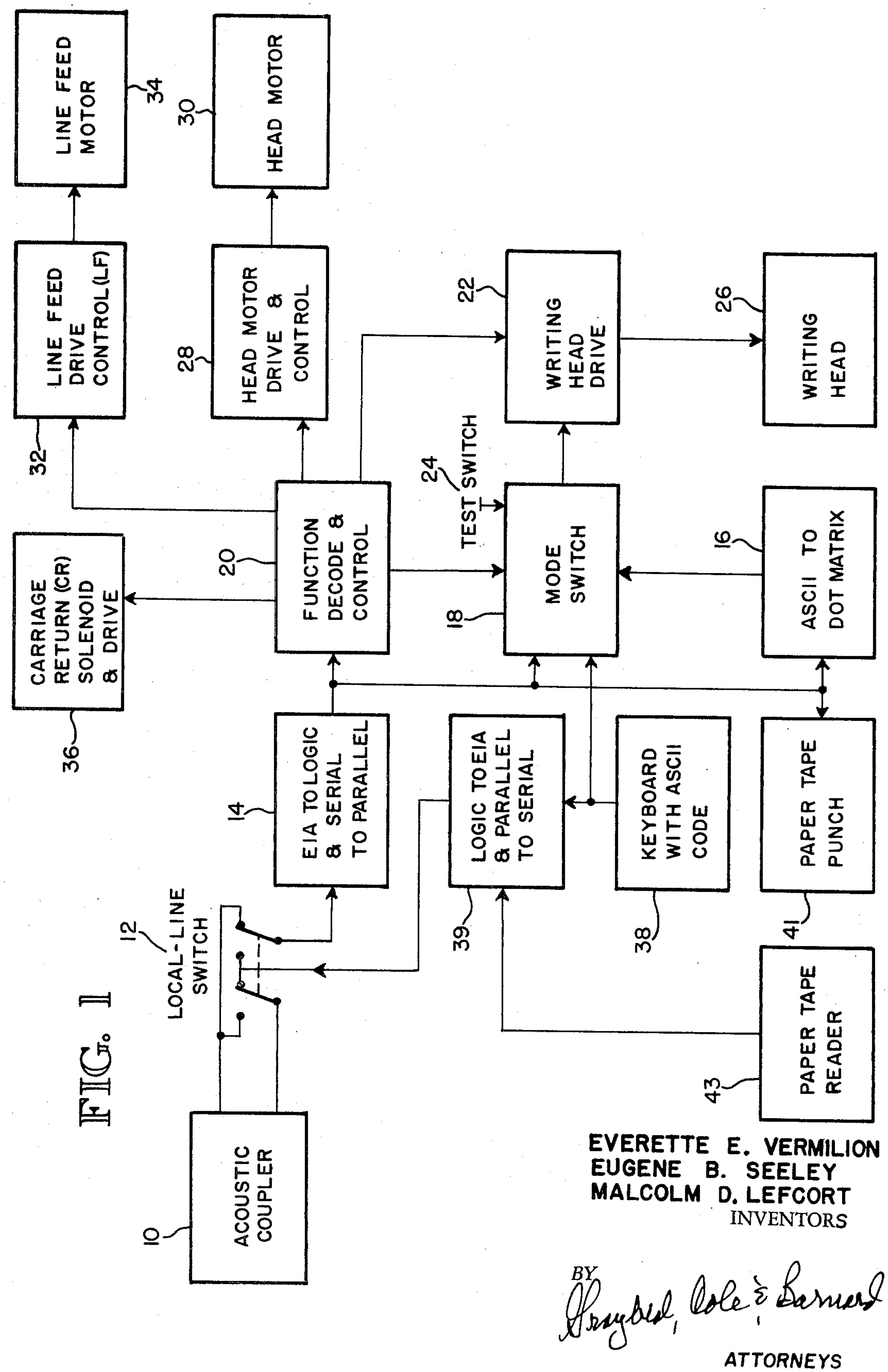
FIG. 1 depicts in block diagram form the operative major components of the invention.

The acoustical data set, or acoustic coupler, 10 provides the link between the telephone line and the terminal. It contains a sound-muffling cradle for the telephone set and necessary electronics to convert serial, binary tones of certain defined frequencies to serial, binary voltages of prescribed levels and conversely. The information sent over the telephone line is in the form of discrete tones. For example, the tones typically shift between the frequencies 2,225 Hertz and 2,025 Hertz, representing logic 0 and logic 1, respectively, when information is being sent to the terminal and between 1,270 and 1,070 Hertz logic 0 and 1 respectively, when the terminal transmits information. Higher speed data sets may use different frequencies. Conversion of the serial, binary tones to serial, binary voltages is in accordance with the Electronic Industries Association (EIA) standards. This standard specifies that the voltage level shall be between plus 3 volts and plus 25 volts for a space or logic 0 and between minus 3 volts and minus 25 volts for a mark or logic 1. A local-line switch 12 enables the built-in acoustic coupler 10 to be switched off for local usage.

The EIA voltage levels from the coupler are converted to levels compatible with logic levels, typically 5 volts, used in the terminal. Thus, the bit stream voltages are converted in the "EIA to logic and serial to parallel" conversion circuit 14. The incoming serial bits defining a code character such as in ASCII are also converted to parallel pulses in this circuit and are then furnished to the "code-to-dot matrix" circuit 16, to the "mode-switch" circuit 18, and to the function decode and control circuit 20.

Figures 2, 3:
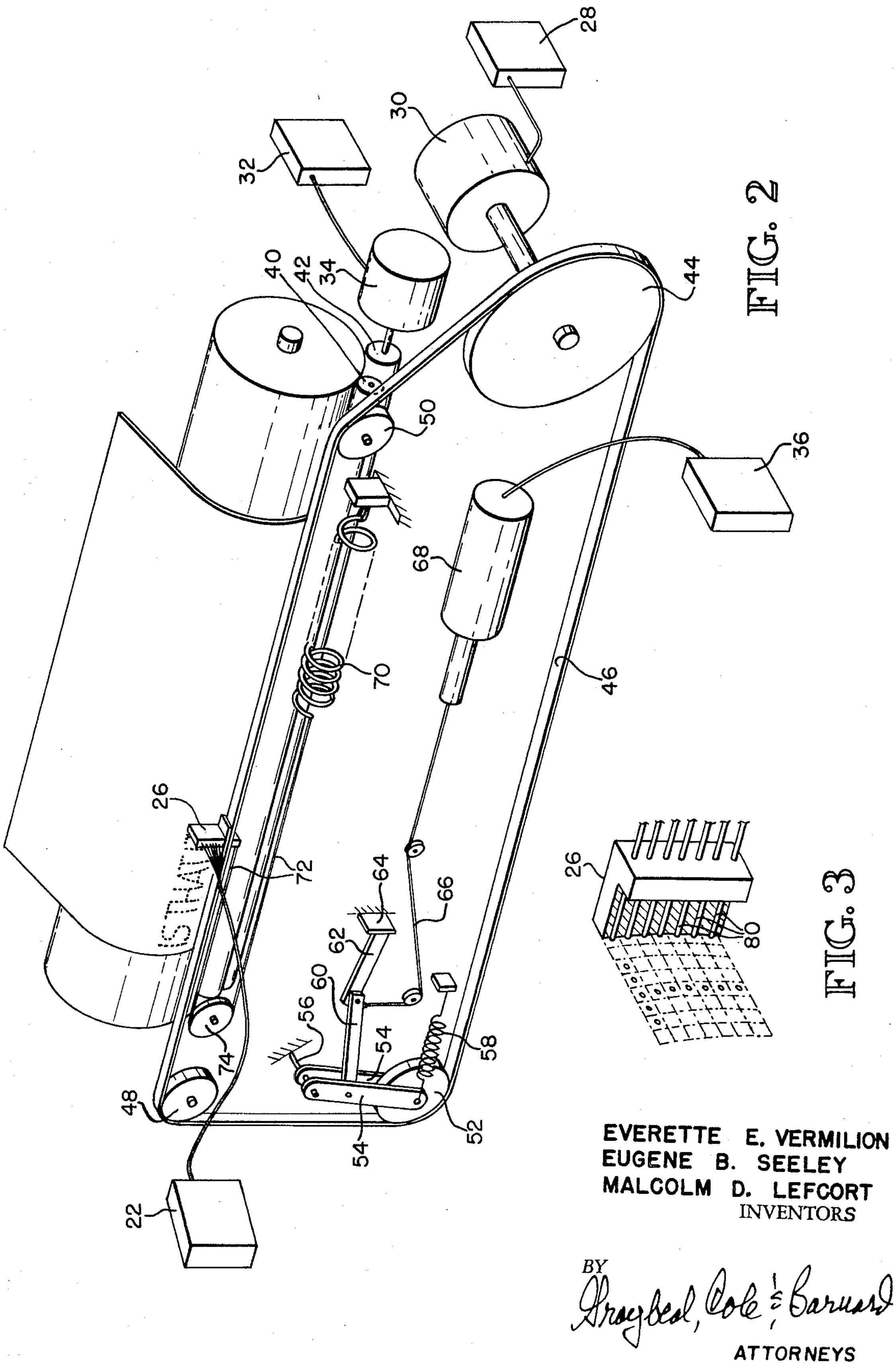
FIG. 2 shows schematically for purposes of illustration only the mechanics of the terminal.
FIG. 3 is a simple diagrammatic representation of the manner in which a head prints a character in a dot matrix.

The "code-to-dot matrix" conversion circuit contains a Read Only Memory or ROM and decodes the 7 ASCII code bits into one of 64 character seven by five dot matrices. As those skilled in the art are aware, the ASCII code also contains an eighth bit for parity as well as one start bit and one or two stop bits for a total of 10 or 11. The character matrix is printed in five vertical columns of seven with two spaces between characters as shown in FIG. 3. The five columns of seven dots are fed through the mode switch circuit 18 to the write head drive circuit 22. The function decode and control circuit 20 synchronizes the write pulses with the head step pulses (described below) so that selected dots in the five columns are energized at the appropriate location in the dot matrix for the particular character decoded.

The mode switch circuit 18 selects one of three different groups of voltages to be supplied to the writing head drive circuit 22. Electrically the circuit is a multiplexer. Instead of switching voltages as a function of time, the voltages are switched in response to three different commands, two of which come from the function decode and control circuit 20. The mechanical analog of this circuit is a three-position, seven-pole switch. The three positions or modes are selected by a "shift-in" command from the control circuit 20, a "shift-out" command from control circuit 20 and by mechanically closing the test switch 24.

In the "shift-in" mode which is used for printing graphics, the 7 parallel bits from conversion circuit 14 are sent directly to the writing head drive circuit 22 through mode switch 18. In the "shift-out" mode which is used to print in alpha-numerics, the 7 parallel bits are first decoded in the code-to-dot matrix circuit 16 and then sent to the writing head drive circuit 22 through mode switch circuit 18. In the "test" mode the 7 ASCII bits generated by the keyboard are fed directly to the writing head drive circuit 22 through mode switch 18. This test mode is used only to check that the keyboard encoding is correct.

The function decode and control circuit 20 monitors incoming data for writing head carriage returns and line feeds for the paper. Should any be present in the bit stream, commands are sent to the appropriate circuits. Commands to step the head motor also originate in this circuit. The incoming data is monitored for "shift-in" and "shift-out" (graphics and alpha-numerics, respectively) commands. In the "shift-in" mode the head 26 is stepped the width of one dot space per 10 or 11 incoming bits. In addition, a line feed results in a paper advance equal to the height of seven dots. In the "shift-out" or alpha-numerics mode the head is stepped seven times across a character space and the seven electrodes are energized during five of these seven steps again as shown in FIG. 3. The function decode and control circuit 20 synchronizes the head steps and the write pulses so that the dots are evenly spaced across the character. Also in "shift-out" or alpha-numerics a line feed results in a paper advance of one-sixteenth of an inch so that the print-out is spaced at the standard six lines per inch.

In the graphics mode the information is still contained in the seven ASCII bits. However, in this mode each bit energizes, or leaves unenergized, one of the seven conductors of the writing head. The logic moves the head 26 only one dot space per seven graphic bits. Since most graphs have large areas of blank spaces, printing time can be significantly reduced when information is limited by the dial-up telephone network by printing blank spaces as if the terminal were in the alpha-numeric mode, i.e., by printing seven blank columns in the same time a single blank column would be printed in the graphics mode. Therefore, the computer software is set up so that the terminal will shift between the alpha-numeric mode and the graphics mode while operating, essentially, in the graphics mode. The line feed, as mentioned above, which controls the amount of paper motion between lines, is also changed in the graphics mode. The normal alpha-numeric space of a sixth of an inch or so is eliminated in the graphics mode. In this manner it is possible to cover the entire page with a matrix of, nominally, 0.010 inch diameter dots on 0.015 inch centers. To write in the graphics mode in the same manner used in the alpha-numeric mode special software must be developed. The software structures curve points so they may be printed in the normal manner, creates axes and grid lines and fits smooth curves between the data points where required. The structured, tailored data, when fed to the terminal, then energizes the appropriate conductors at the appropriate locations on the paper to print the desired curve.

The "writing head drive" circuit 22 and head 26 require voltage levels of between 100 and 150 volts to mark the electrosensitive paper satisfactorily. Marking is accomplished by passing a current from the head electrodes, through the paper, to a grounding roller 40. Current passage reduces the paper coating and results in a dot mark. The writing head drive circuit 22 raises the level of the write pulses from logic levels emanating from the mode switch 24 to the higher voltage levels required to mark the paper through writing head 26.

The "head motor drive control" circuit 28 controls head motor 30 which is a stepping motor. A single motor step draws the head 26 the width of one dot across the paper. The head motor drive control circuit 28 contains the circuitry necessary to step the motor upon command from the function decode and control circuit 20.

A stepping motor 34 or two solenoids (not shown) are used to drive the paper roller. In the stepping motor case a "line feed drive control" circuit 32 receives its commands from the function decode and control circuit 20 and in turn steps the line feed motor 34. Motor 34 in turn drives paper feed roller 42. A single step of line feed motor 34 advances the paper the height of one dot. Because of the requirement for different line feeds as between graphics and alpha-numerics, the line feed motor 34 is stepped seven times for a graphics line feed and twelve times for an alpha-numerics line feed. In the case where two solenoids are used for line feed, three high resolution overrunning clutches are used. One clutch prevents reversed shaft rotation while each of the other clutches is connected to one of the solenoids. The stroke of each solenoid is adjusted to attain the desired line feed, one for graphics, one for alpha-numerics. The function decode and control circuit 20 determines the number of line feed pulses sent to motor 34 or the solenoids through control circuit 32.

In order to better understand operation of the terminal FIG. 2 is provided so that elements and components as they are discussed can be visualized in their environment. Head motor 30 is connected to drive pulley 44. A taut band 46 is driven by pulley 44 and engages idler pulleys 48 and 50 and a tension pulley 52. Tension pulley 52 is mounted on a pair of pivotal arms 54 mounted on stationary shaft 56. The arms 54 and thus pulley 52 are normally biased by tension spring 58 to swing the tension pulley inwardly and thus relax tension on band 46. Tension is maintained by a pair of toggle arms 60 and 62, one of which is pivotally attached to arms 54 and the other of which is pivotally attached to a stationary mounting 64. A cable 66 connects the toggle arms 60 and 62 to solenoid 68. When the solenoid is actuated, toggle arms 60 and 62 are pulled downwardly to force tension pulley 52 outwardly against the band and thus take up slack in band 46. When power is removed from the solenoid, the band relaxes and is free to slip over head motor pulley 44. A carriage return tension spring 70 is mounted just under the top run of the band and is connected to cable 72 which extends around idler pulley 74 and is anchored to the carriage for head 26. Return spring 70 pulls the carriage and head 26 to the left-hand edge of the paper. Spring 70 is extended as the head is drawn across the paper by motor 30. When the return solenoid 68 is deprived of power, as pointed out above, and band tension relaxes, the return spring snaps the head back to the left-hand margin of the paper. Electronics required to activate the solenoid constitute the "carriage return solenoid and drive circuit" 36. Pulses to turn on circuit 36 originate in the function decode and control circuit 20.

As shown in FIG. 3 only schematically head 26 has seven electrodes or conductors mounted on a carriage attached to band 46. While the details are not shown, the construction of the head carriage and its mounting on band 46 are such that when band 46 is under tension, the head 26 is torsionally spring loaded against the paper. When tension is relaxed, the connection between the head carriage and the band is such that the head 26 will pivot away from the paper while carriage return spring 70 is returning the carriage and the head back to the left-hand edge of the paper. Obviously, in this way the head electrodes 80 are cleared of the paper just prior to the head and carriage being pulled to the left by the return spring.

When the terminal transmits information, the information has originated at the terminal keyboard 38 and is in parallel bit form. For transmittal over the coupler the information must be in serial bit form and the voltage levels must be compatible with the EIA interface. Accordingly, the "logic to EIA and parallel to serial" conversion circuit 38 converts output from keyboard 38 to EIA requirements.

Most of the foregoing discussion has dealt with the case of a coupler transmitting to and receiving information from a remote station such as a time-shared computer. There are times when it is desirable to prepare off-line, especially when a paper-tape punch 41 and paper tape reader 43 are incorporated in the terminal. For these occasions, the local-line switch 12 is provided. In the "local" position keyboard information bypasses the coupler entirely and the printer prints out directly from keyboard 38. In the "line" position the coupler 10 is included in the circuit path.

It will be understood that the principles of this invention could apply as well to thermally sensitive paper or light sensitive paper, since marks can be made to appear on paper by using styli which are heated and cooled or by styli through which light is transmitted in response to commands from the system. Additionally, the dot matrix need not necessarily be a five-by-seven array as discussed above, since the principles of the invention will apply to any arrangement of styli in the head. It will also be appreciated that the head instead of utilizing a single row of conductors could be provided with a full dot matrix of, for instance, a seven-by-seven styli arrangement. In this case the head would move the distance of a character space and stop and the vertical dot columns sequentially fired to print the alpha-numeric characters or graphics exactly as described above while the head is stationary. The head would then be stepped to the next space.

It will also be appreciated that this discussion has employed the ASCII code merely for purposes of illustration. Other codes may be used without departing from the principles of this invention.

What is claimed is:

1. In a method for remote terminal printing of alpha-numerics and graphic displays on electrosensitive paper the steps of:

a. receiving at said terminal incoming serially coded data bit pulses containing alpha-numeric characters and graphics information and converting said bit pulses from serial to parallel, b. directing parallel characters bit pulses as received to a decoder circuit and converting the same to a dot matrix for transmission to a writing head, where said bit pulses produce dot-defined characters on said paper, and c. directing parallel graphics bit pulses as received directly to said writing head for producing dot-defined data on said paper.

2. The method according to claim 1 and also including directing incoming coded data pulses to a control circuit for monitoring said data and for commanding terminal operations and to a mode switching means for selectively determining by command from said control circuit whether said terminal writing head will print in graphics or alpha-numerics.

3. The method according to claim 2 including selectively commanding through said control circuit other terminal operations such as carriage and writing head movement across said paper, carriage and writing head returns, when said writing head is to print, and line feed of paper for said writing head.

4. The method according to claim 3 and including selectively commanding through said control circuit the rate of writing head movement for printing in alpha-numerics and the rate of writing head movement for printing in graphics.

5. The method according to claim 4 and including commanding movement of said writing head to move at the alpha-numerics rate when traversing blank spaces in printing graphics.

6. In a method for remote terminal printing of alpha-numeric characters and graphic displays on electrosensitive paper, in which the terminal includes a writing head with a vertical array of printing conductors for printing dots on said paper, and also includes means for moving said writing head across said paper, means for feeding paper to said writing head and writing head return means, the steps of:

a. receiving at said terminal incoming serially coded data bit pulses containing alpha-numeric characters and graphics information and converting the same to logic voltage levels and also converting said bit pulses from serial to parallel for simultaneous transmission to other circuits, b. directing parallel character bit pulses as received to a decoder circuit and converting the same to a dot matrix for transmission to said writing head conductors where said bit pulses produce dot-defined characters on said paper, and c. directing parallel graphics bit pulses as received directly to said writing head for producing dot-defined data on said paper.

7. The method according to claim 6 and also including directing incoming coded data pulses to a control circuit for monitoring said data and for commanding terminal operations and to a mode switching means for selectively determining by command from said control circuit whether said terminal writing head will print in graphics or alpha-numerics.

8. The method according to claim 7 including selectively commanding through said control circuit other terminal operations such as carriage and writing head movement across said paper, carriage and writing head returns, when said writing head is to print, and line feed of paper for said writing head.

9. The method according to claim 8 and including selectively commanding through said control circuit the rate of writing head movement for printing in alpha-numerics and the rate of writing head movement for printing in graphics.

10. The method according to claim 9 and including commanding movement of said writing head to move at the alpha-numerics rate when traversing blank spaces while printing in the graphics mode.

11. In a remote computer terminal printing system including a writing head with a vertical array of printing conductors for printing dots on electrosensitive paper, means for moving said writing head across said paper, means for feeding paper to said writing head and writing head return means the improvements, comprising:

a. first circuit means for receiving serially coded data pulses containing alpha-numeric characters and/or graphics information and converting said coded pulses from serial to parallel for simultaneous transmission to other circuits, b. second circuit means for decoding parallel character pulses and converting the same to a dot matrix for transmission to said printing head conductors, c. switching means for receiving parallel graphics pulses directly from said first circuit means and parallel alpha-numeric character pulses from said second circuit means and for selectively transmitting the same to said writing head, d. third circuit means for controlling terminal functions including said switching means and for selectively determining whether parallel graphics pulses are to be sent directly from said first circuit means through said switching means to said writing head conductors or whether said parallel character pulses are sent from said second circuit means through said switching means to said writing head conductors.

12. The system according to claim 11 and including fourth circuit means for receiving either parallel graphic pulses or parallel character pulses from said switching means and transmitting the same to said writing head conductors, said fourth circuit means also receiving print commands for said writing head conductors from said third circuit means.

13. The system according to claim 12 and including fifth circuit means for receiving commands from said third circuit means for driving said means for moving said head across said paper.

14. The system according to claim 13 and including sixth circuit means for receiving commands from said third circuit means for driving said means for feeding paper to said writing head.

15. The system according to claim 14 and including seventh circuit means for receiving commands from said third circuit means for driving said writing head return means.

* * * * *